(12) United States Patent
Light et al.

(10) Patent No.: US 7,937,042 B2
(45) Date of Patent: *May 3, 2011

(54) ANIMAL TRAINING AND TRACKING SYSTEM USING RF IDENTIFICATION TAGS

(75) Inventors: Elliott D. Light, Rockville, MD (US); Brian Boesch, Marlton, NJ (US); Jon L. Roberts, Great Falls, VA (US)

(73) Assignee: Dot Holdings, LLC, Wilmington, DE (US)

( * ) Notice: Subject to any disclaimer, the term of this patent is extended or adjusted under 35 U.S.C. 154(b) by 197 days.

This patent is subject to a terminal disclaimer.

(21) Appl. No.: 11/113,088

(22) Filed: Apr. 22, 2005

(65) Prior Publication Data

US 2005/0217607 A1    Oct. 6, 2005

Related U.S. Application Data

(63) Continuation-in-part of application No. 10/865,466, filed on Jun. 10, 2004, which is a continuation-in-part of application No. 09/591,167, filed on Jun. 9, 2000, now Pat. No. 6,748,902.

(51) Int. Cl.
*H04B 17/00* (2006.01)
(52) U.S. Cl. ....... 455/67.11; 455/68; 455/419; 119/719; 119/720
(58) Field of Classification Search .............. 455/69, 455/88, 67.11, 418–421; 119/719–721
See application file for complete search history.

(56) References Cited

U.S. PATENT DOCUMENTS

| 4,335,682 A | 6/1982 | Gonda et al. |
| 4,675,656 A * | 6/1987 | Narcisse .................. 340/539.21 |
| 4,792,796 A | 12/1988 | Bradshaw et al. |
| 4,802,482 A * | 2/1989 | Gonda et al. ..................... 119/29 |
| 4,898,120 A * | 2/1990 | Brose ............................ 119/721 |
| 4,918,425 A | 4/1990 | Greenberg et al. |
| 5,054,428 A | 10/1991 | Farkus |
| 5,067,441 A * | 11/1991 | Weinstein ....................... 119/29 |
| 5,204,657 A | 4/1993 | Prosser et al. |
| 5,223,815 A | 6/1993 | Rosenthal et al. |
| 5,353,744 A | 10/1994 | Custer |
| 5,381,129 A | 1/1995 | Boardman |
| 5,425,330 A * | 6/1995 | Touchton et al. ............. 119/721 |

(Continued)

OTHER PUBLICATIONS

Rob Harrill, "A watch that's smarter than you?", http://www.eurekalertorg/pub_releases/2004-10/uow-awt100604.php, Oct. 6, 2004.

(Continued)

*Primary Examiner* — Tuan H. Nguyen
(74) *Attorney, Agent, or Firm* — Perkins Coie LLP

(57) ABSTRACT

An animal training device for administering audio stimulus and physical encouragement to an animal. The trainer has a transmitter with variable signal strength. The animal worn device had a receiver that senses the signal strength. If the signal strength drops to a preset limit indicative of distance from the transmitter, a tone is sounded. Further signal drop results in a shock being delivered. Alternatively, a trainer module comprises an RFID poller and an animal module comprises an RFID tag. The poller sends a polling signal to the RFID tag. The polling signal is reflected back to the trainer module where the reflective signal is used to determine a separation distance. If the separation distance exceeds a preset threshold, an encouragement command is sent from the trainer module to the animal module.

16 Claims, 7 Drawing Sheets

U.S. PATENT DOCUMENTS

| | | | |
|---|---|---|---|
| 5,461,365 A | 10/1995 | Schlager et al. | |
| 5,465,687 A | 11/1995 | Custer | |
| 5,477,210 A | 12/1995 | Belcher | |
| 5,553,469 A | 9/1996 | Seidel | |
| 5,605,116 A | 2/1997 | Kim et al. | |
| 5,638,050 A | 6/1997 | Sacca et al. | |
| 5,642,690 A | 7/1997 | Calabrese et al. | |
| 5,646,593 A | 7/1997 | Hughes et al. | |
| 5,648,757 A | 7/1997 | Vernace et al. | |
| 5,686,891 A | 11/1997 | Sacca et al. | |
| 5,781,102 A | 7/1998 | Huang | |
| 5,790,021 A | 8/1998 | Mickel et al. | |
| 5,844,489 A * | 12/1998 | Yarnall, Jr. et al. | 340/573 |
| 5,857,433 A | 1/1999 | Files | |
| 5,868,100 A | 2/1999 | Marsch | |
| 5,870,973 A * | 2/1999 | Touchton et al. | 119/721 |
| 5,939,988 A | 8/1999 | Neyhart | |
| 5,977,913 A | 11/1999 | Christ | |
| 6,011,471 A | 1/2000 | Huang | |
| 6,019,066 A | 2/2000 | Taylor | |
| 6,047,664 A | 4/2000 | Lyerly | |
| 6,064,308 A | 5/2000 | Janning et al. | |
| 6,075,443 A | 6/2000 | Schepps et al. | |
| 6,084,513 A * | 7/2000 | Stoffer | 340/572.2 |
| 6,131,535 A | 10/2000 | So | |
| 6,135,060 A | 10/2000 | So | |
| 6,151,276 A * | 11/2000 | Peinetti | 367/139 |
| 6,155,208 A | 12/2000 | Schell et al. | |
| 6,163,261 A | 12/2000 | Westrick | |
| 6,166,635 A | 12/2000 | Huang | |
| 6,166,643 A | 12/2000 | Janning et al. | |
| 6,167,843 B1 | 1/2001 | Kim | |
| 6,169,484 B1 | 1/2001 | Schuchman et al. | |
| 6,170,439 B1 | 1/2001 | Duncan et al. | |
| 6,184,790 B1 | 2/2001 | Gerig | |
| 6,191,693 B1 | 2/2001 | Sangsingkeow | |
| 6,230,661 B1 | 5/2001 | Yarnall, Jr. et al. | |
| 6,283,065 B1 * | 9/2001 | Shorrock et al. | 119/863 |
| 6,349,212 B1 * | 2/2002 | Martensson et al. | 455/462 |
| 6,360,698 B1 * | 3/2002 | Stapelfeld et al. | 119/720 |
| 6,405,132 B1 | 6/2002 | Breed et al. | |
| 6,412,813 B1 | 7/2002 | Breed et al. | |
| 6,474,269 B2 * | 11/2002 | So | 119/720 |
| 6,529,131 B2 | 3/2003 | Wentworth | |
| 6,577,238 B1 | 6/2003 | Whitesmith et al. | |
| 6,600,422 B2 | 7/2003 | Barry et al. | |
| 6,674,364 B1 | 1/2004 | Holbrook et al. | |
| 6,686,881 B1 | 2/2004 | Lu et al. | |
| 6,687,609 B2 | 2/2004 | Hsiao et al. | |
| 6,714,133 B2 * | 3/2004 | Hum et al. | 340/573.4 |
| 6,720,920 B2 | 4/2004 | Breed et al. | |
| 6,812,824 B1 * | 11/2004 | Goldinger et al. | 340/10.1 |
| 6,820,897 B2 | 11/2004 | Breed et al. | |
| 6,837,427 B2 | 1/2005 | Overhultz et al. | |
| 6,917,291 B2 | 7/2005 | Allen | |
| 2002/0073931 A1 * | 6/2002 | Boesch et al. | 119/719 |
| 2002/0198632 A1 | 12/2002 | Breed et al. | |
| 2003/0121480 A1 * | 7/2003 | Grimsley et al. | 119/721 |
| 2003/0233189 A1 | 12/2003 | Hsiao et al. | |
| 2004/0155777 A1 * | 8/2004 | Mitchell et al. | 340/568.1 |

OTHER PUBLICATIONS

Suresafe Technology Inc. Product Descriptions, http://www.suresafe.com.tw/series3.html?Frame=off, Feb. 17, 2004.

TrackIT Corp. Product Description; "Mobile Security Goes High Tech", http://www.trackitcorp.com, Dec. 7, 1998.

\* cited by examiner

ANIMAL TRAINING AND TRACKING SYSTEM USING RF IDENTIFICATION TAGS

CROSS REFERENCE TO RELATED APPLICATIONS

This application is a continuation in part of application Ser. No. 10/865,466, filed Jun. 10, 2004, currently pending, which is a continuation in part application of application Ser. No. 09/591,167, filed Jun. 9, 2000, now U.S. Pat. No. 6,748,902. The Ser. Nos. 10/865,466 and the 09/591,167 applications are incorporated herein by reference in their entirety for all purposes.

BACKGROUND

This invention relates generally to training of animals. More particularly the present invention is a form of wireless electronic leash and training aid for animals.

Animal training, particularly for household pets such as dogs, requires a great deal of patience. Further the training of dogs in particular has been the subject of many books for both owners as well as professional trainers regarding how to best train an animal to obey the wishes of its owner.

In the field of training, various devices have been invented which are designed to keep animals within a confined area. For example the now ubiquitous "electronic fence" is seen everywhere as a means of keeping animals within a specific area. The electronic fence comprises a wire surrounding an area in which an animal is to be confined. An electronic current placed on the wire giving it a magnetic field and/or the wire is used as an RF transmitter. A collar is then attached to the animal which is capable of sensing the electronic field. When the strength of the electronic field is at a certain level, an audible warning is given to the animal. As the animal gets closer to the buried wire, an electronic shock is administered to the animal thereby providing a physical incentive for the animal to stay away from the buried electrical wire. Over a training period of time, the animal become becomes familiar with the meaning of the audible sound and the general location of the buried wire. In this fashion the animal is trained to stay within a confined area by virtue of the audible signal and the electronic shock in the event that the animal gets too close to the buried wire.

However, animal owners cannot carry a buried wire wherever they go. As a result teaching an animal to "heel" must be accomplished by means of leashes and other physical means.

Animal control devices of various types have been the subject of much invention. For example, it has been proposed to have an animal worn radio signal receiver having appropriate electronics to receive a signal from an antenna and to administer both audible stimulation and electrical stimulation. For additional details, refer to U.S. Pat. No. 5,425,330 issued to Touchton et al.

It has also been proposed to provide a collar worn device having an antenna receiver controller and high voltage generator to administer a shock to an animal. This device relies upon the fact that electrical field strength with a receiving antenna decreases with distance from a transmitter. This invention relies upon a stationary transmitter to provide the appropriate signal. A shock is administered to the animal that strays beyond a distance from the transmitter. For additional details, refer to U.S. Pat. No. 4,898,120 issued to Brose.

Another proposal relies upon field strength changes to administer a shock to an animal based upon an animal worn device. Transmitters are stationary in defined locations where the animal is permitted and not permitted to go. For additional details, refer to U.S. Pat. No. 5,642,690 issued to Calabrease et al.

Another proposal takes the form of electronic fence and control device. The control device is worn by the animal and is combined with a radio frequency transmitter for generating radio signals. When the animal strays too close to a wire having a certain field strength a shock is delivered to the animal via an animal worn device. A provision is made for both audible stimulation and electrical stimulation when an animal strays too close to the limits of a defined area. For additional details, refer to U.S. Pat. No. 5,067,441 issued to Weinstein.

Another proposal comprises an animal worn device with an electrode for providing a shock to the animal. This system comprises a perimeter wire placed at the boundary of a defined space that sends a signal through the perimeter wire to generate a coded field. When the animal strays too close to the buried wire the collar delivers a electrical shock stimulus to the animal. This system is generally stationary with the receiver carried by the animal. For additional details, refer to U.S. Pat. No. 5,353,744 issued to Custer.

Yet another electronic containment system has been proposed wherein the animal or person wears a transceiver that also delivers an audible signal, a deterring shock or both when the person or animal leaves a predefined area. A stationary home base station detects and reads data transmitted from the transceiver. Again, one of the embodiments of this invention comprises a buried wire for defining a perimeter. Again a stationary system for transmission with, in this instance a transceiver, being worn by the individual or animal to be controlled. For additional details, refer to U.S. Pat. No. 5,844,489 issued to Yarnall et al.

Another proposal has an animal worn unit that comprises a GPS receiver, transmitter, and a programming unit that allows a person to program the location for a particular boundary in geographic terms. When a GPS signal is received that indicates the animal is near a predefined boundary, an electrical stimulation is administered. Thus the animal worn device in this instance comprises the stimulation means but also comprises a GPS receiver combined with an audible signal and electrical shock generation means. For additional details, refer to U.S. Pat. No. 5,868,100 issued to Marsh.

Another proposed system comprises an animal worn device capable of receiving an electronic signal and applying an adverse electrical stimulus and audible signal to control an animal. This invention discloses a portable transmitter that has certain buttons for administering sound, shock, and combination of both upon a specific actuation by the animal trainer. Various stimuli administered to an animal are administered only in response to push buttons that are depressed. For additional details, refer to U.S. Pat. No. 4,335,682 issued to Gonda et al.

Another proposed portable transmitter cooperates with an animal worn receiver that applies stimulation to the skin of the animal. In this instance the portable unit allows a trainer to select a stimulus to be applied to the animal when the trainer desires. For additional details, refer to U.S. Pat. No. 4,802,482 issued to Gonda.

Yet another proposal comprises a hand held transmitter that controls a receiver unit, which is attached to a collar worn by an animal to be trained. In this case voice commands are communicated to an animal via a speaker that is associated with the receiving unit worn by the animal. In the event that the animal disobeys a particular command, negative reinforcement is provided in the form of a mild electrical shock. For additional details, refer to U.S. Pat. No. 5,605,116 issued to Kim et al.

Another proposes system comprises an animal worn device for delivering audible or electrical stimulation to an animal if it fails to conform to expected behavior. A portable transmitter sends the signal that is desired by the animal trainer. Again in this instance the animal trainer takes positive action to transmit a RF control signal to the collar mounted receiver simulator unit. For additional details, refer to U.S. Pat. No. 5,054,428 issued to Farkus.

Another proposal uses yet another form of a GPS receiver type device. The animal worn GPS receiver comprises both the GPS system and an adverse stimuli-administering circuitry to shock the animal wearing the device. Thus not only can animal control be administered but the animal can be tracked as well. Adverse stimuli are applied using a hand held remote control unit to adversely stimulate the animal wearing the collar. The hand held unit determines the GPS position of the animal and administers a stimulus as desired by the trainer. Thus, the position of the trainer and the position of the animal are calculated and the trainer administers the shock as desired. For additional details, refer to U.S. Pat. No. 5,857,433 issued to Files.

A buried electric fence system is designed for confining the movement of an animal to a defined area. A radio signal is transmitted through an antenna that defines the area. This system is a form of buried wire system that defines a perimeter by virtue of the buried wire. A signal is sent through the buried wire such that when an animal approaches the wire, a collar worn receiver administers a mild electrical shock to the animal. For additional details, refer to U.S. Pat. No. 5,465,687 issued to Custer.

Yet another proposal provides an animal worn device that receives a signal from a transmitter. The animal worn receiver has a means to administer a stimulus to the animal. Both audible and electrical shock stimulus are administered to the animal when there is an electrical indication of a signal loss as when the animal wanders away from a predefined area. A fixed antenna transmits an RF signal to the collar worn device. For additional details, refer to U.S. Pat. No. 5,381,129 issued to Boardman.

Another animal worn control device has a receiver that receives a radio signal and a transducer for applying a stimulus to the animal in response to the signal. This invention addresses the programming apparatus associated with a programmable animal control device. This control device allows operating frequency of the receiver to be controlled the type and intensity of shock and audio stimulus as well as related perimeters. For additional details, refer to U.S. Pat. No. 5,533,469 issued to Touchton et al.

Thus it can be seen that much of the background art discloses animal collars and their circuitry, means for applying electrical shocks and audible stimuli to the animal worn device, a wide variety of "buried wire" systems together with associated stationary transmitters. All of which circuitry is disclosed in the references cited. Further several instances of portable transmitters are also illustrated for control of GPS, and for allowing animal trainers to administer shocks to animals when desired. Much of the circuitry in the references cited will be known by those skilled in the art to be applicable to the present invention.

However, what would be truly useful would be a system that comprises a form of "electronic leash" or training device which can be variably preset by an animal owner and operated in automatic mode to help train and control an animal when the owner and animal are moving such as when the owner is walking the animal. Such a system and method would allow the training of an animal to take place regardless of the location of the owner. Such a system would allow an owner to train an animal in the animal's own backyard and, when the owner and the animal are in another location other than the home. Such a system would be portable and operate without the need of a connection to household current at all times. Such a system would allow the owner to spontaneously alter the conditions of training by adjusting the training perimeter on the fly by adjusting the transmitted signal strength.

SUMMARY

It is therefore an aspect of the present invention to be able to train animals.

It is a further aspect of the present invention to train animals regardless of the location of where the owner and animal happen to be.

It is yet another aspect of the present invention to train animals without the need for a leash.

It is still another aspect of the present invention to train animals without the need for an electrical connection to a household current.

It is still another aspect of the present invention to train animals using wireless technology.

It is a further aspect of the present invention to allow wireless animal training apparatus to be adjustable so that various ranges for animal motion can be set.

It is further an aspect of the present invention to allow the trainer using a wireless animal training apparatus to adjust on the fly the training perimeter by permitting spontaneous adjustment of the transmitted signal strength.

These and other aspects of the present invention will become apparent from a review of the specification that follows.

The present invention comprises a system and method for the training of animals. The present invention comprises two basic elements. The first element is the trainer device (TD). The trainer device is the device that is held by the trainer and has variable settings as will be more fully explained. The second element of the invention is the animal device (AD). The animal device is basically a receiver as will be more fully explained below.

The trainer device comprises a power supply, which can be a rechargeable or single use battery. The power supply supplies power to a processor that has certain variable settings as may be desired by the trainer. The processor is connected to an RF transmitter that transmits a radio signal having a limited range.

For purposes of training, the trainer may desire to set a range at which alarms of various types may be created for the animal being trained. This allows essentially a distance radius over which an animal may move before an alarm is given to the animal. This distance radius is variably set in the training device by the trainer. Thereafter the processor provides appropriate energy to the transmitter to allow the desired radius distance to be set.

In the beginning of a training session, the trainer may desire the animal to be kept very close in radius distance to the trainer. Once the animal is trained, the trainer can extend the radius distance by a simple setting on the training device.

The second element of the present invention is the animal device (AD). The AD comprises a power supply, which can be a rechargeable or single use battery. The animal device is worn as a collar around the animal so that the appropriate signals and physical encouragement can be applied. The animal device further comprises a receiver having the ability to measure signal strength. When signal strength is high, no audible or other physical indicator is given to the animal. When the receiver senses a signal strength at some intermediate level, an audible warning is given to the animal that it should not stray further from the trainer. If the signal strength descends to a low level, a physical "encouragement" in the form of a shock is given to the animal so that it does not stray farther from the trainer.

While training may initially occur with the use of some physical means such as a leash in order to both provide a physical feedback that is accompanied by the audible feedback, eventually the training device of the present invention will be able to be used without a physical restraining means by the trainer.

In an embodiment of the present invention, a lead-less animal training device comprises an animal module worn by an animal and a trainer module.

The animal module comprises an RFID tag that receives a polling signal and transmits a reflected signal, a command receiver, and physical encouragement means. The trainer module comprises an RFID tag query manager that sends the polling signal, an RFID receiver that receives the reflected signal from the RFID tag. The trainer module determines a separation distance between the animal module and the trainer module based on an attribute of the reflected signal and transmits a physical encouragement command when the separation distance exceeds a predetermined threshold. In an embodiment of the present invention, the attribute of the signal is a measure of signal strength associated with a separation distance. In another embodiment of the present invention, the attribute of the reflected signal is that the reflected signal is not detectable by the receiver. In yet another embodiment of the present invention, the attribute of the reflected signal is the time of reception of the reflected signal relative to the time the polling signal is sent.

The command receiver in the animal module receives the physical encouragement command. The physical encouragement means administers physical encouragement to the animal in response to the physical encouragement means. In an embodiment of the present invention, the physical encouragement command comprises a shock command and the physical encouragement means comprises a shock producer. In another embodiment of the present invention, the shock command is issued when the separation distance exceeds a shock threshold distance. In yet another embodiment of the present invention, the physical encouragement command comprises an audio command and the physical encouragement means comprises a sound producer. In this embodiment, the audio command is issued when the separation distance exceeds an audio threshold distance. In still another embodiment of the present invention, the physical encouragement command comprises a shock command issued when the separation distance exceeds a shock threshold distance and an audio command issued when the separation distance exceeds an audio threshold distance, and the audio threshold distance is less than the shock threshold distance.

In an embodiment of the present invention, the RFID query manager is adapted to vary the polling signal power. In another embodiment of the present invention, the RFID query manager is adapted to vary the RFID receiver sensitivity.

In yet another embodiment of the present invention, a lead-less animal training device comprising and animal module worn by an animal and a trainer module. The animal module comprises an RFID tag adapted to receive a polling signal and to transmit a reflected signal, a command receiver, and physical encouragement means. The reflected signal comprises an identifier unique to the RFID tag.

The trainer module comprises an RFID tag query manager that sends the polling signal and an RFID receiver that receives the reflected signal from the RFID tag. The trainer module acquires the RFID tag identifier from the reflected signal and determines a separation distance between the animal module and the trainer module based on an attribute of the reflected signal. In another embodiment of the present invention, the attribute of the reflected signal is that the reflected signal is not detectable by the receiver. In yet another embodiment of the present invention, the attribute of the reflected signal is the time of reception of the reflected signal relative to the time the polling signal is sent.

The training module selects a transmission link based on the RFID tag identifier and transmits a physical encouragement command over the selected transmission link when the separation distance exceeds a predetermined threshold associated with the RFID tag identifier.

The command receiver of the animal module receives the physical encouragement command over the selected transmission link and administers physical encouragement to the animal in response to the physical encouragement means. In an embodiment of the present invention, the physical encouragement command comprises a shock command and the physical encouragement means comprises a shock producer. In another embodiment of the present invention, the shock command is issued when the separation distance exceeds a shock threshold distance. In yet another embodiment of the present invention, the physical encouragement command comprises an audio command and the physical encouragement means comprises a sound producer. In this embodiment, the audio command is issued when the separation distance exceeds an audio threshold distance. In still another embodiment of the present invention, the physical encouragement command comprises a shock command issued when the separation distance exceeds a shock threshold distance and an audio command issued when the separation distance exceeds an audio threshold distance, and the audio threshold distance is less than the shock threshold distance.

In an embodiment of the present invention, the RFID query manager is adapted to vary the polling signal power. In another embodiment of the present invention, the RFID query manager is adapted to vary the RFID receiver sensitivity.

DETAILED DESCRIPTION

Figure 1:
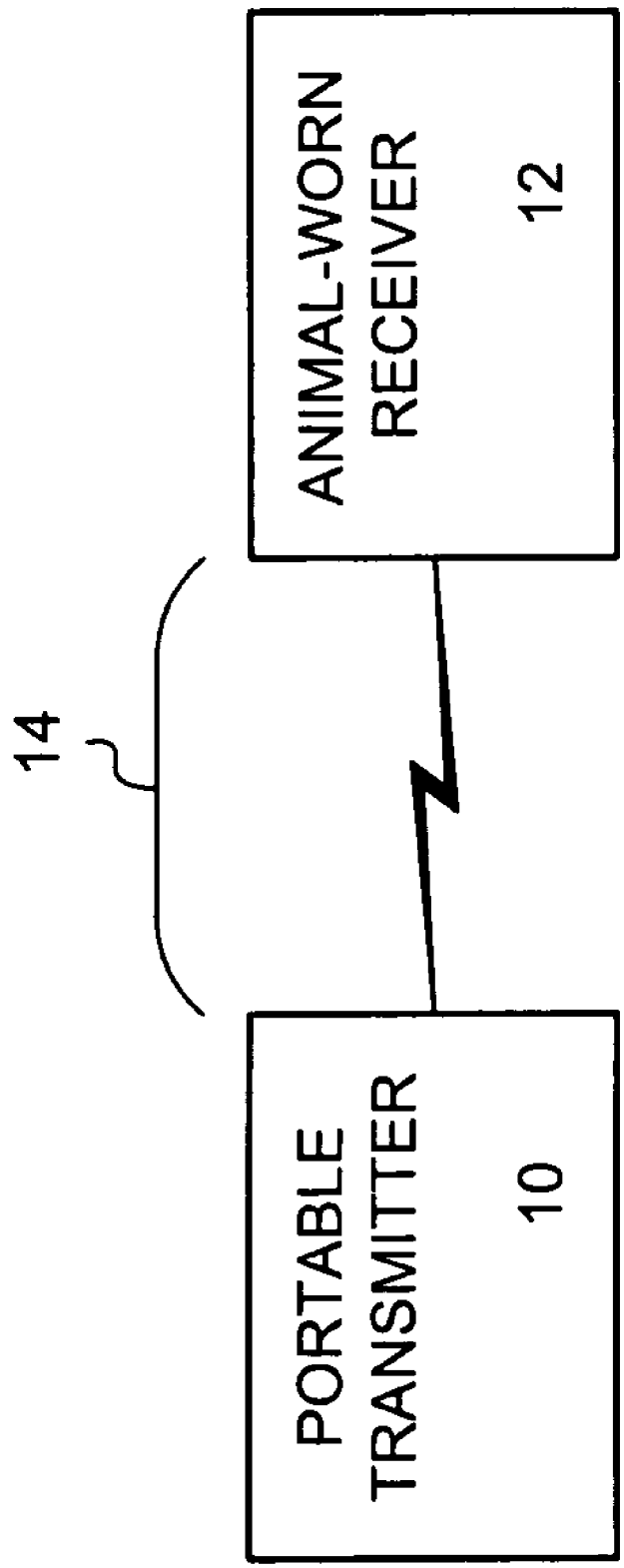
FIG. 1 illustrates the overall architecture of the present invention including the training device and the receiver.

As noted above, the present invention comprises both a system and method for animal training using a wireless training device and animal device. Referring first to FIG. 1, a generalized architecture of the present invention is illustrated. The trainer carries the training device 10 that comprises a transmitter for transmitting an RF signal to an animal device 12 worn by the animal. The radius distance 14 is configurable by the trainer.

Figure 2:
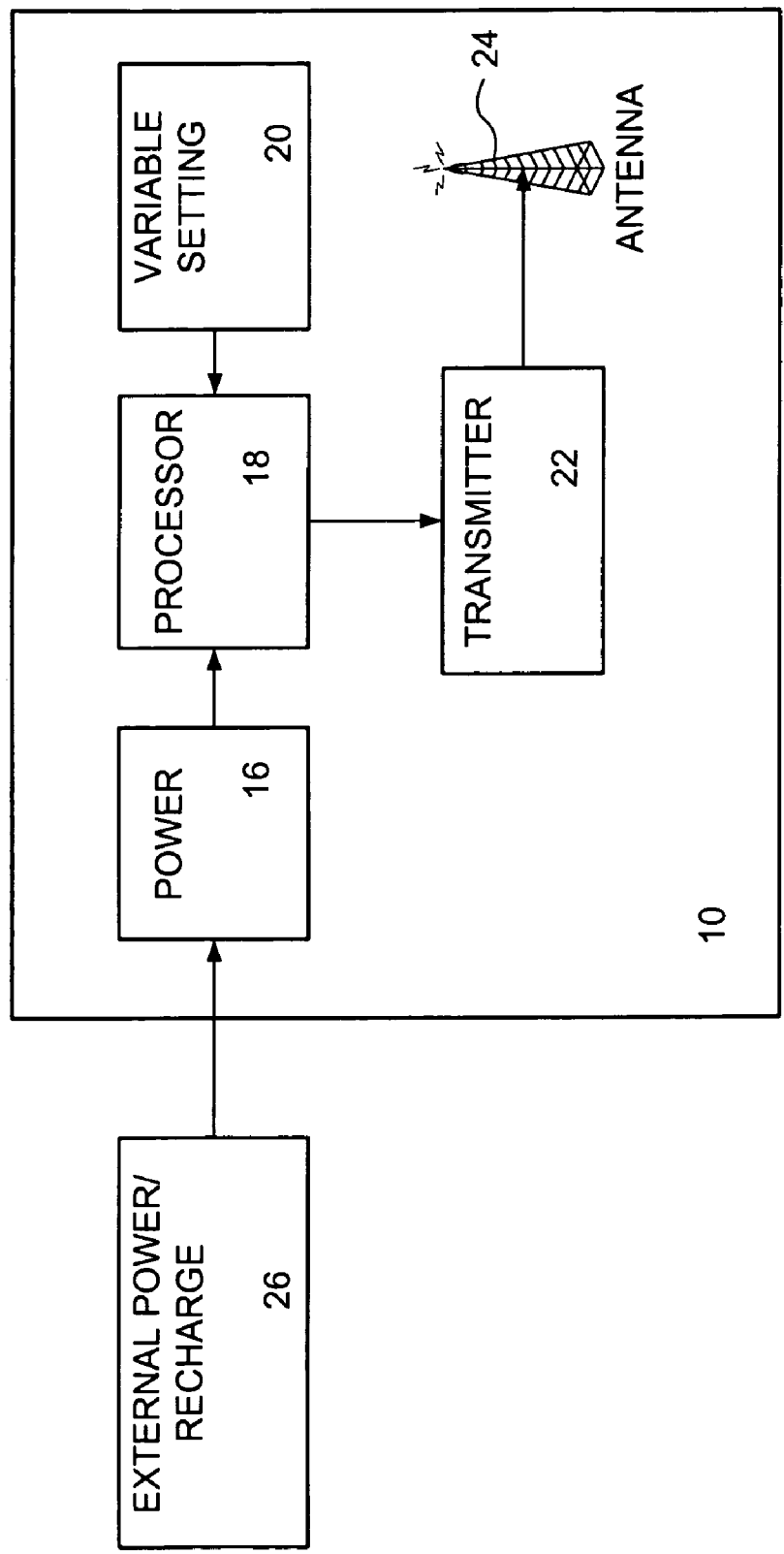
FIG. 2 illustrates a general schematic of the training device.

Referring to FIG. 2, the training device of the present invention is generally illustrated. Training device 10 comprises a power supply 16 which can be either a rechargeable or single use battery. In the event that the battery is a rechargeable one, the training device can be recharged with household current 26 or the battery can be removed from the unit and charged in a charger connected to household current.

The power supply is connected to a microprocessor 18 that comprises processing capability and for storage of variable parameters. The variable parameters are input by a variable setting means 20 which can be a dial, digital setting or other types of setting means known in the art. When the trainer desires to set a specific radius distance, such a distance in input in the variable setting 20 thus providing instructions to the processor 18.

Once the processor receives settings on the desired radius distance, the signal is sent to the transmitter 22 to apply the appropriate power to the transmission as instructed by the processor 18. A signal is then transmitted over antenna 24 which can then be received by the animal device 12. Depending upon the radius distance set by the trainer, the transmitted signal will be stronger or weaker as desired. The radius distance setting is adjustable on the fly by the trainer. This provides the trainer with the ability to spontaneously alter the conditions of training for the animal, without need to first bring the animal back into close proximity.

Figure 3:
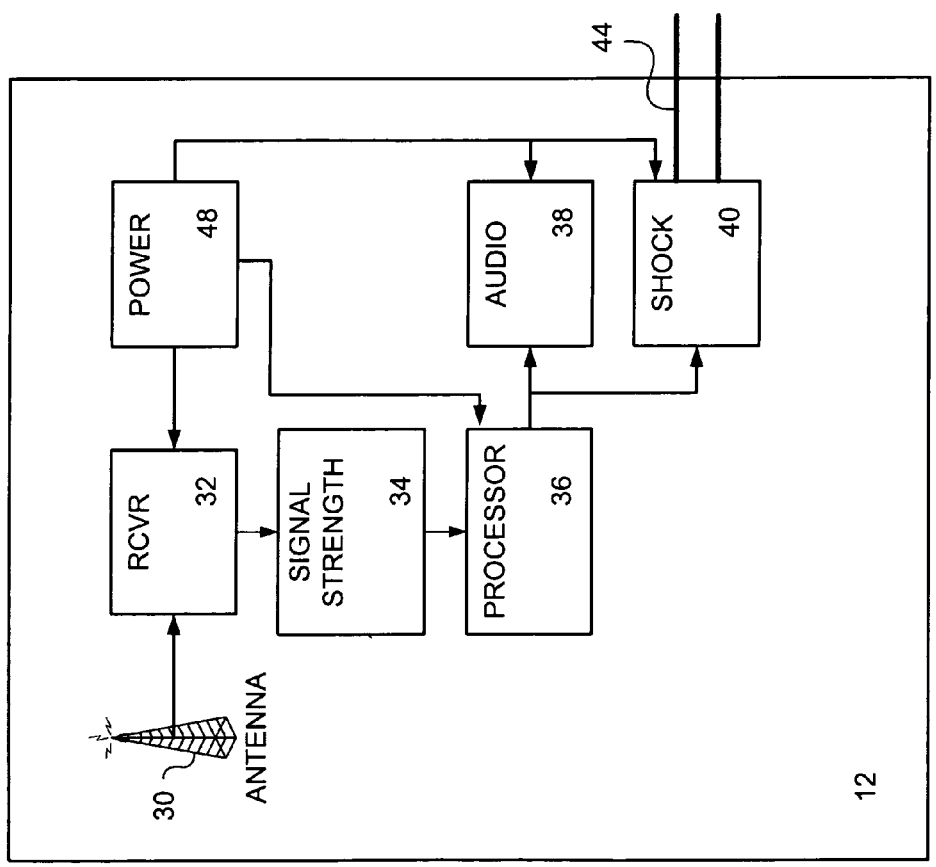
FIG. 3 illustrates a general schematic of the animal device.

Referring to FIG. 3, the animal device is illustrated. Animal device 12 is a self-contained unit that is worn on a collar or other attachment to the animal. For example, a horse may the animal device in some form of harness whereas a dog may have it in a form of collar. The method of affixing the animal device to the animal is not meant as a limitation. Any means known in the art for affixing devices to animals is satisfactory for the present invention.

Animal device 12 receives the signal from training device 10 via an antenna 30. The antenna is connected to an internal receiver 32 that has the capability of receiving and digitizing the signal strength 34 so that the signal strength can be determined. Once the signal strength 34 is determined it is provided to a microprocessor 36 in the animal device. Micro processor 36 interprets the signal strength and, depending upon the level of the signal strength, sends a signal to an audible alarm 38 which in turn powers a speaker 42 which provides an audible signal to the animal when the signal strength is at some intermediate or warning level.

If the animal continues to wander further after hearing the audible alarm, the receiver 32 continually senses signal strength 34 and provides the appropriate digital signal to processor 36 that the signal is below a certain level indicative of a further radius distance from the trainer. When the signal strength drops below a certain level indicative that the animal has wandered farther than the trainer would desire, and beyond the audible signal 38 a signal is sent to an electric current generator 40 which then applies an electrical current via electrodes 44 to the animal administering a mild shock thereby providing a physical "encouragement" to the animal to return to the appropriate radius distance from the trainer.

The animal device also can operate from single use or rechargeable batteries 48 which provides power to the animal device. If rechargeable batteries are used, the entire unit can be plugged into household current or the batteries can be removed and recharged in a battery charger.

Figure 4:
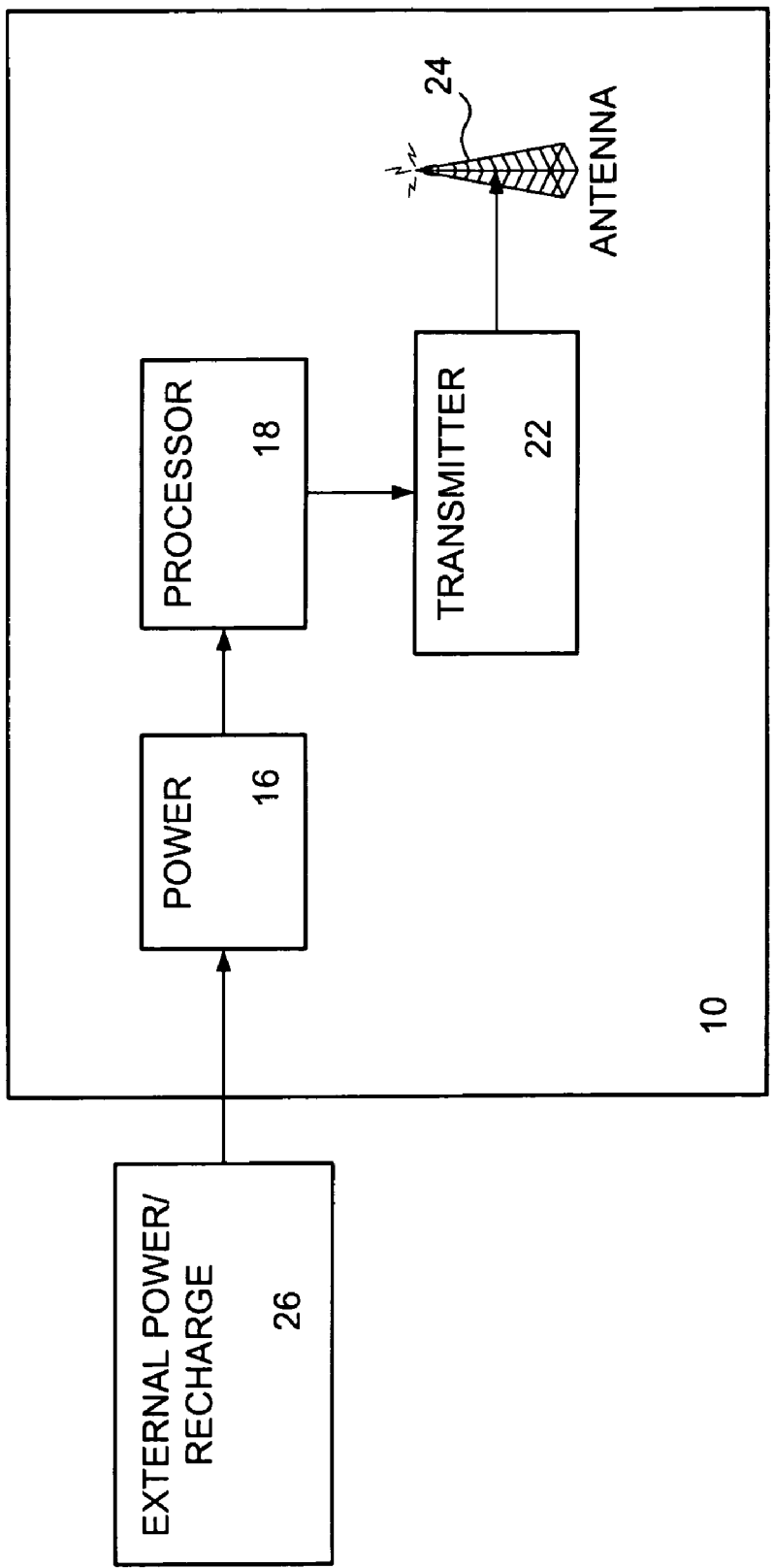
FIG. 4 illustrates an alternative embodiment of the present invention.

Referring to FIG. 4, an alternative embodiment of the present invention is illustrated. In this instance the variable setting is established by virtue of setting a radius distance on the animal device rather than on the trainer device. Thus FIG. 4 illustrates the trainer device having a somewhat more simplified architecture comprising a power supply 16 connected to a transmitter 22 which transmit over an antenna 24. Thus the need for a variable power setting in the transmitter is eliminated.

Figure 5:
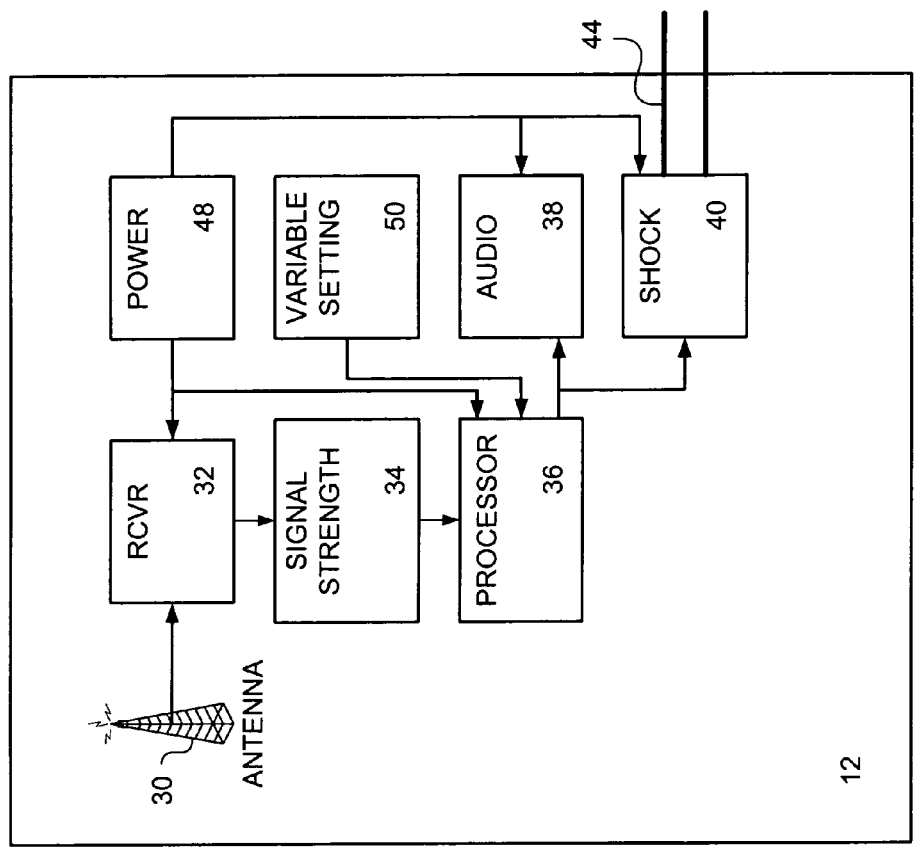
FIG. 5 illustrates the animal-worn portion of the device of the present invention.

Referring to FIG. 5, the animal-worn portion of the device of the present invention is illustrated. In this instance animal device 12 comprises an antenna 30 which is connected to a receiver 32 in turn is powered by battery 48. The receiver 32 calculates signal strength 34 and inputs the signal strength information to processor 36. In this instance however the processor can receive variable settings from a variable input device 50. This device sets various levels within processor 36 indicative of the radius distance that the trainer desires to have and at which outer limits of radius distance signals an physical encouragements are provided to the animal. Once the variable setting is set 50 on the animal device 12 the processor 36 constantly monitors the signal strength 34 to determine whether an audible feedback to the animal should be given. If audible feedback is to be given 38 a tone is provided over speaker 42 to the animal. If the signal strength drops below a certain level as set by the variable setting 50 a shock is administered 40 to the animal over electrode 44.

As noted above part of the animal training process may require some physical restraint such as a leash in order to have the animal associate various distances with tones and shocks. However, once the animal learns of the various audible and physical signals, training can continue without the physical restraining means.

Figure 6:
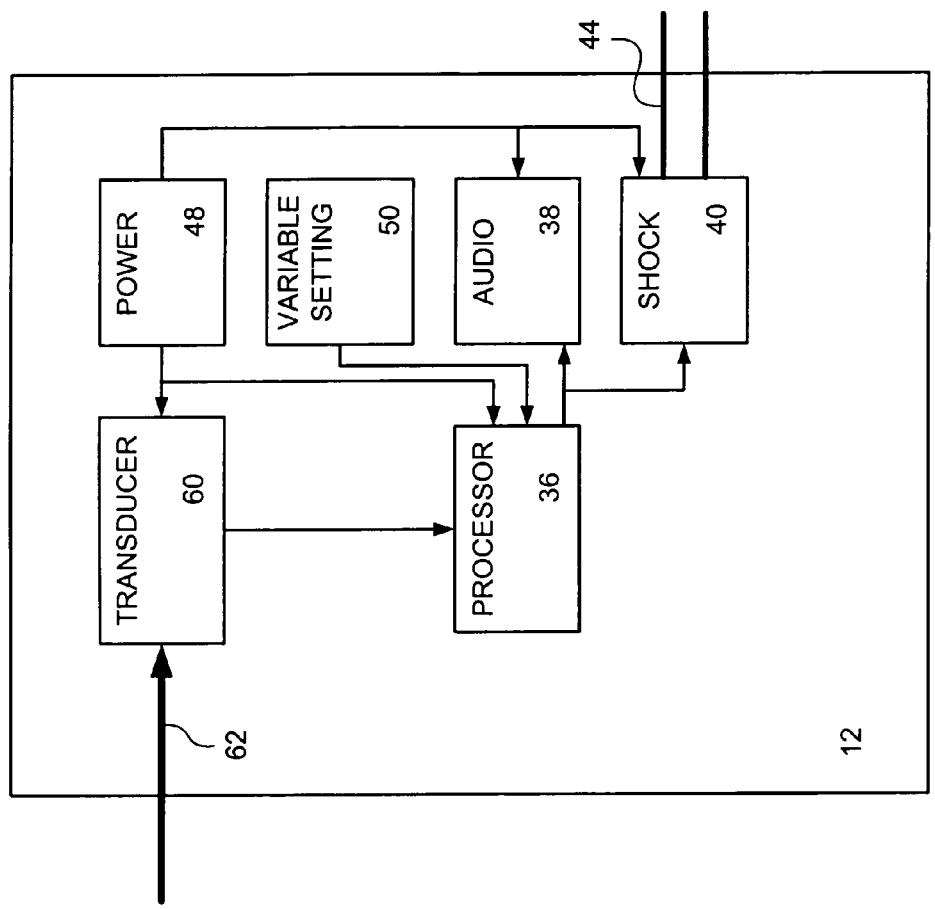
FIG. 6 illustrates a leash embodiment of the present invention.

To further assist in training the animal and as noted above the animal worn portion of the present invention can also receive strength signals based upon the strength with which the animal pulls on the leash or lead of the owner. Referring to FIG. 6, the leash or lead embodiment of the animal-worn portion of the device of the present invention is illustrated. In this instance animal device 12 comprises a transducer 60 connected physically to the leash or lead either directly to the leash or via a transducer on the animal collar connected to the remaining circuitry of the present invention. The transducer or other similar strength measuring gauge such as spring, strain gauges or any other device capable of measuring and sensing the pull place on the leash or lead by the animal. The transducer is and the remaining portions of the system are powered by battery 48. The transducer 60 measures the signal strength placed on the leash by the animal and inputs the signal strength information to processor 36. In this instance however the processor can receive variable settings from a variable input device 50. This device sets various levels within processor 36 indicative of the strength of pull, and the limits, which the trainer desires to have and at which limits of pull a physical and/or audio encouragement is provided to the animal. Once the variable setting is set 50 on the animal device 12 the processor 36 constantly monitors the signal strength from transducer 60 to determine whether an audible feedback to the animal should be given. If audible feedback is to be given 38 a tone is provided over speaker 42 to the animal. If the signal strength exceeds the limit set by the trainer by the variable setting 50 a shock is administered 40 to the animal over electrode 44.

In this fashion the animal learns that pull too hard during a session results in negative reinforcement. Thus the animal learns not to pull.

Figure 7:
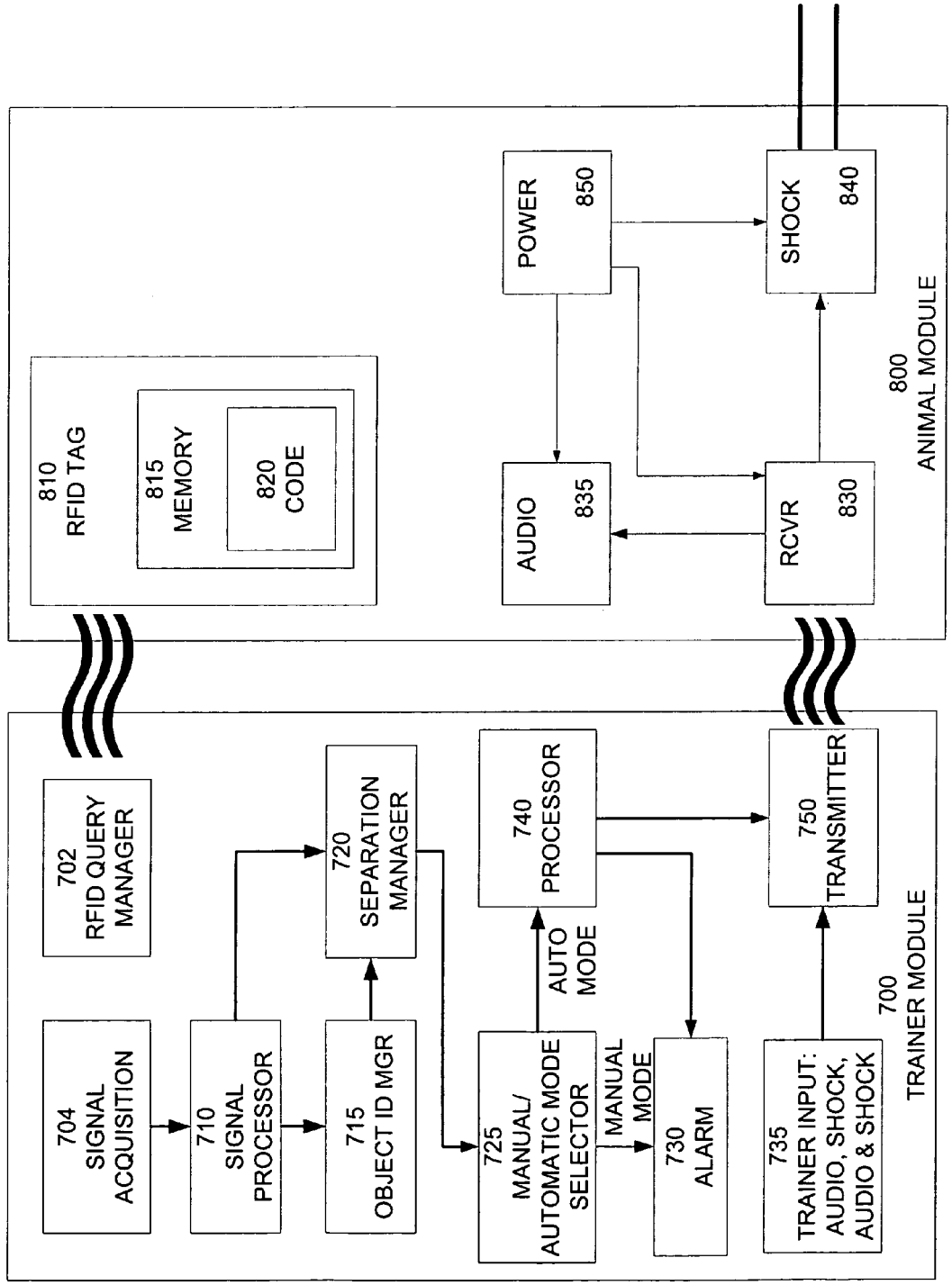
FIG. 7 illustrates the logical elements of an animal training system utilizing an RFID tag and poller according to an embodiment of the present invention.

In another embodiment of the present invention, RFID technology is used to establish the communications between the training device and the animal worn part. FIG. 7 illustrates the logical elements of a leadless electronic tether utilizing an RFID tag according to embodiments of the present invention. Referring to FIG. 7, a trainer module 700 comprises an RFID tag query manager 702, a signal acquisition element 704, a signal processor 710, an object identification manager 715, a separation manager 720, a manual/automatic mode selector 725, an alarm 730 and a trainer input 735 (for manual mode selection), a processor 740 (for automatic mode selection), and a transmitter 750. Not illustrated is a power supply that powers the components of the trainer module 700.

The animal module 800 comprises an RFID tag 810. In the embodiment illustrated in FIG. 7, RFID tag 810 is a passive device. However, the present invention is not so limited. Semi-passive or active RFID tags may be utilized in animal module 800 without departing from the scope of the present invention. RFID tag 810 comprises memory 815 in which code 820 is stored. Memory 815 may be either a read only memory or programmable read/write memory. Receiver 830 provides signals to an audio alarm 835 and/or a shocking system 840 based on signals received from transmitter 750. Power supply 850 is illustrated to make clear that RFID tag 810 requires no source of power to operate for its intended purpose.

RFID query manager 702 sends a query signal during a preset time period. In another embodiment of the present invention, the power of the query signal sent by query manager 702 may be adjusted thereby allowing a separation distance threshold between the trainer module 700 and the animal module 800 to be established. The query signal is received by RFID tag 810 and reflected back to trainer module 700. The reflected signal comprises the code 820 stored in memory 815.

Signal acquisition element 704 receives the reflected signal emitted by RFID tag 810. The signal acquisition element 710 comprises a device or devices appropriate to receive the signal generated by RFID tag 810. In an embodiment of the present invention, the sensitivity of the signal acquisition element 704 may be adjusted thereby allowing an additional means by which a separation distance threshold between the trainer module 700 and the animal module 800 may be established.

The reflected signal from the signal acquisition element 704 is received and processed by signal processor 710. The processed signal is sent from signal processor 710 to an object identification manager 715 to obtain the animal module code 820. The signal is also provided to separation manager 720 to determine if the distance between the animal module 800 and the trainer module 700 exceeds a preset separation distance. If the preset separation distance is exceeded, the separation manager 720 sends an alert signal to manual/automatic mode selector 725. In one embodiment of the present invention, separation manager 720 determines that the preset separation distance has been exceeded based on a lack of a reflected signal from RFID tag 810.

In another embodiment of the present invention, separation manager 720 uses the signal strength of the reflected signal to determine that the preset separation distance has been exceeded.

In yet another embodiment of the present invention, separation manager 720 measures the delay between the transmission of the polling signal and reception of the reflected signal to determine that the preset separation distance has been exceeded.

As will be appreciated by those skilled in the art, other means may be used to determine that the preset separation distance has been exceeded without departing from the scope of the present invention.

In conjunction with the variable power of the query signal emitted by query manager 702 and the variable sensitivity of the signal acquisition element 704, the separation distance threshold may be adjusted.

In an embodiment of the present invention, the manual/automatic mode selector 725 is set to "manual" and the alert signal is sent to alarm 730. In another embodiment of the present invention, the manual/automatic mode selector 725 is set to "automatic" and the alert signal is sent to processor 740 and then to alarm 730. In an embodiment of the present invention, alarm 730 comprises an audible alarm and a visual indicator that identifies the particular animal module 800 that has exceed the preset separation distance. By way of illustration and not as a limitation, the visual indicator may be a LED indicator and/or an LCD display. In yet another embodiment, the alarm 730 comprises a voice synthesizer that announces that an animal has exceeded the predetermined separation distance. Optionally, the animal is identified by name or a descriptor.

The code 820 associated with RFID tag 810 permits the animal module 700 to track the behavior of more than one animal. Because the code 820 may be unique, the code also allows multiple trainer modules to be operated in proximity to each other without interference.

In the automatic mode, processor 740 of trainer module 700 determines a response to the animal's behavior based on preset user selections. In the manual mode, the user selects from an audio stimulus, a shock stimulus, or a combined shock and audio stimulus. The response is sent to transmitter 750.

In an embodiment of the present invention, transmitter 750 sends signal to animal module 800 using a modulation and channel selection scheme to permit the signals to be selectively received by receiver 830. By way of illustration and not as a limitation, transmitter 750 uses a spread spectrum modulation scheme keyed to the RFID code 820.

Receiver 830 receives the signal from transmitter 750 and actuates the audio stimulus device 835, the shock stimulus device 840 or both.

A system and method for training of animals using a wireless device has been illustrated. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A wireless tracking device, comprising:
   an REID tag query manager configured to send a polling signal at a first time;
   an RFID receiver configured to receive a reflected signal produced by an REID tag in response to the polling signal at a second time;
   an object identification manager configured to obtain an identifier of the RFID tag from the reflected signal; and
   a separation manager configured to (a) determine a separation distance between the REID tag and the wireless tracking device based on a difference between the first time and the second, and (b) transmit a physical encouragement command to the REID tag via a transmission link corresponding to the identifier of the REID tag when the separation distance exceeds a predetermined threshold associated with the REID tag.

2. The wireless tracking device of claim 1 wherein the separation distance is determined based on a combination of the difference between the first time and the second time and aattribute comprises at least one of signal strength of the reflected signal and time of reception.

3. The wireless tracking device of claim 1, further comprising a plurality of REID receivers having a plurality of identifiers, and wherein the object identification manager is configured to obtain the identifiers.

4. The wireless tracking device of claim 1 wherein the polling signal is adjustable to adjust the predetermined threshold associated with the RFID tag.

5. The wireless tracking device of claim 1 wherein the encouragement command is configured to cause a sound to be emitted.

6. The wireless tracking device of claim 5 wherein the volume of the sound is varied as the separation distance varies.

7. The wireless tracking device of claim 1 wherein the RFID tag query manager is located on a first device and the RFID tag is located on a second device.

8. The wireless tracking device of claim 7 wherein the separation manager is located on the first device.

9. The wireless tracking device of claim 7 wherein the separation manager is located on the second device.

10. A method for tracking a remote unit, the method comprising:
    transmitting a polling signal from a location at a first time;
    receiving a reflected signal produced by an RFID tag in response to the polling signal at a second time, the REID tag being attached to a remote object;
    identifying the remote object based on data represented in the reflected signal;
    determining a separation distance between the REID tag and the location based on a time difference between the first and second times; and
    transmitting a command to the REID tag via a transmission link corresponding to the identified remote object when the separation distance between the RFID tag and the location exceeds a predetermined threshold associated with the remote object.

11. The method of claim 10 wherein the location comprises a first portable device and the remote object comprises a second portable device.

12. The method of claim 10 wherein determining the separation distance between the REID tag and the location further comprises detecting a signal strength of the reflected signal and the predetermined threshold comprises a strength threshold.

13. The method of claim 10 wherein the command contains instructions to sound an alarm.

14. The method of claim 10, further comprising a plurality of RFID tags attached to a plurality of remote objects, wherein identifying the remote objects comprises identifying the plurality of remote objects.

15. The method of claim 14, wherein at least one of the remote objects has a name, and wherein transmitting a command comprises transmitting instructions to sound an alarm based on the name.

16. The method of claim 15 wherein the alarm comprises a voice synthesizer configured to speak the name.

* * * * *

UNITED STATES PATENT AND TRADEMARK OFFICE
CERTIFICATE OF CORRECTION

| | | |
|---|---|---|
| PATENT NO. | : 7,937,042 B2 | |
| APPLICATION NO. | : 11/113088 | |
| DATED | : May 3, 2011 | |
| INVENTOR(S) | : Light et al. | |

It is certified that error appears in the above-identified patent and that said Letters Patent is hereby corrected as shown below:

Title page, item (63), under "Related U.S. Application Data", in Column 1, Line 2, delete "Jun. 10, 2004," and insert -- Jun. 10, 2004, now abandoned, --.

Title page, item (56), under "Other Publications", in Column 2, Line 2, delete "eurekalertorg" and insert -- eurekalert.org --.

Column 1, line 8, delete "currently pending," and insert -- now abandoned, --.

Column 10, line 56, in Claim 1, delete "REID" and insert -- RFID --.

Column 10, line 59, in Claim 1, delete "REID" and insert -- RFID --.

Column 10, line 64, in Claim 1, delete "REID" and insert -- RFID --.

Column 10, line 66, in Claim 1, delete "second," and insert -- second time, --.

Column 10, line 67, in Claim 1, delete "REID" and insert -- RFID --.

Column 11, line 1, in Claim 1, delete "REID" and insert -- RFID --.

Column 11, line 3, in Claim 1, delete "REID" and insert -- RFID --.

Column 11, line 7, in Claim 2, delete "aattribute comprises at least one of" and insert -- a --.

Column 11, line 8, in Claim 2, delete "signal and time of reception." and insert -- signal. --.

Column 11, line 9, in Claim 3, delete "REID" and insert -- RFID --.

Column 11, line 32, in Claim 10, delete "REID" and insert -- RFID --.

Signed and Sealed this
Thirtieth Day of August, 2011

David J. Kappos
*Director of the United States Patent and Trademark Office*

CERTIFICATE OF CORRECTION (continued)
U.S. Pat. No. 7,937,042 B2

Column 12, line 3, in Claim 10, delete "REID" and insert -- RFID --.

Column 12, line 6, in Claim 10, delete "REID" and insert -- RFID --.

Column 12, line 15, in Claim 12, delete "REID" and insert -- RFID --.